(12) United States Patent
Krämer et al.

(10) Patent No.: US 10,327,543 B2
(45) Date of Patent: *Jun. 25, 2019

(54) EDGE TRIM FOR PIECES OF FURNITURE

(71) Applicant: Rehau AG + Co., Rehau (DE)

(72) Inventors: Uwe Krämer, Rehau (DE); Peter Glaser, Rehau (DE)

(73) Assignee: REHAU AG + CO., Rehau (DE)

( * ) Notice: Subject to any disclaimer, the term of this patent is extended or adjusted under 35 U.S.C. 154(b) by 312 days.

This patent is subject to a terminal disclaimer.

(21) Appl. No.: 15/137,537

(22) Filed: Apr. 25, 2016

(65) Prior Publication Data

US 2016/0235192 A1 Aug. 18, 2016

Related U.S. Application Data

(63) Continuation-in-part of application No. 13/833,137, filed on Mar. 15, 2013, now Pat. No. 9,565,943, (Continued)

(30) Foreign Application Priority Data

Aug. 24, 2007 (DE) .................... 20 2007 011 911 U

(51) Int. Cl.
*B32B 3/10* (2006.01)
*A47B 13/08* (2006.01)
(Continued)

(52) U.S. Cl.
CPC .......... *A47B 13/083* (2013.01); *A47B 95/043* (2013.01); *B29C 63/003* (2013.01);
(Continued)

(58) Field of Classification Search
None
See application file for complete search history.

(56) References Cited

U.S. PATENT DOCUMENTS

| 5,989,657 | A | * | 11/1999 | Wurz | ..................... A47B 95/04 428/31 |
| 2002/0060209 | A1 | * | 5/2002 | Heerman | ............... B23K 26/18 219/121.72 |
| 2007/0113967 | A1 | * | 5/2007 | Connor | .................. C07C 251/22 156/272.2 |

FOREIGN PATENT DOCUMENTS

EP 1163864 A1 * 12/2001 ........... A47B 96/201

OTHER PUBLICATIONS

Machine translation of EP1163864 Retrieved on May 14, 2018.*

* cited by examiner

*Primary Examiner* — Christopher M Polley
(74) *Attorney, Agent, or Firm* — Preston Smirman; Smirman IP Law, PLLC

(57) ABSTRACT

An edge trim for pieces of furniture, including a meltable layer, is described. The molecular structure of the meltable layer contains both polar and non-polar parts. By way of a non-limiting example, an edge trim for pieces of furniture having an exposed edge of wooden or wood substitute material is described, comprising a molten layer and a structural layer, wherein the structural layer and the molten layer are connected in an adhesive bond, wherein the molten layer is made of a material that is chemically modified such that polar and non-polar components are found in a single molecular structure, wherein the molten layer contains energy absorbing additives, wherein the energy absorbing additives of the molten layer are selected from the group consisting of metal oxides, metal phosphates, metal salts of organic anions and combinations thereof.

18 Claims, 2 Drawing Sheets

Related U.S. Application Data which is a continuation-in-part of application No. 12/666,649, filed as application No. PCT/EP2008/004520 on Jun. 6, 2008, now Pat. No. 8,603,610.

(51) Int. Cl.
*B32B 27/08* (2006.01)
*B32B 27/32* (2006.01)
*B32B 7/02* (2019.01)
*A47B 95/04* (2006.01)
*B29C 65/14* (2006.01)
*B29C 65/16* (2006.01)
*B29C 65/48* (2006.01)
*B29C 65/50* (2006.01)
*B29C 65/00* (2006.01)
*B29C 63/00* (2006.01)
*B29C 65/02* (2006.01)
B29L 31/44 (2006.01)
*B29C 65/08* (2006.01)
*B29C 65/10* (2006.01)

(52) U.S. Cl.
CPC .......... *B29C 65/02* (2013.01); *B29C 65/1432* (2013.01); *B29C 65/1483* (2013.01); *B29C 65/1632* (2013.01); *B29C 65/1683* (2013.01); *B29C 65/4815* (2013.01); *B29C 65/4865* (2013.01); *B29C 65/5057* (2013.01); *B29C 66/112* (2013.01); *B29C 66/114* (2013.01); *B29C 66/30322* (2013.01); *B29C 66/30326* (2013.01); *B29C 66/472* (2013.01); *B29C 66/712* (2013.01); *B29C 66/723* (2013.01); *B29C 66/7392* (2013.01); *B29C 66/73162* (2013.01); *B29C 66/7487* (2013.01); *B32B 7/02* (2013.01); *B32B 27/08* (2013.01); *B32B 27/32* (2013.01); *B29C 65/08* (2013.01); *B29C 65/103* (2013.01); *B29C 65/1406* (2013.01); *B29C 65/1425* (2013.01); *B29C 65/1454* (2013.01); *B29C 65/1654* (2013.01); *B29C 65/483* (2013.01); *B29C 66/71* (2013.01); *B29C 66/72321* (2013.01); *B29C 66/72325* (2013.01); *B29C 66/72326* (2013.01); *B29C 66/72329* (2013.01); *B29C 66/73161* (2013.01); *B29L 2031/44* (2013.01); *Y10T 428/24777* (2015.01); *Y10T 428/24942* (2015.01); *Y10T 428/266* (2015.01); *Y10T 428/269* (2015.01); *Y10T 428/2817* (2015.01); *Y10T 428/2826* (2015.01); *Y10T 428/31786* (2015.04); *Y10T 428/31931* (2015.04); *Y10T 428/31938* (2015.04)

EDGE TRIM FOR PIECES OF FURNITURE

CROSS REFERENCE TO RELATED APPLICATIONS

The instant application is a continuation-in-part of U.S. patent application Ser. No. 13/833,137, filed Mar. 15, 2013, now U.S. Pat. No. 9,565,943, issued Feb. 14, 2017, which is a continuation-in-part of U.S. patent application Ser. No. 12/666,649, filed May 21, 2010, now U.S. Pat. No. 8,603,610, issued Dec. 10, 2013, which is a National Stage of PCT International Patent Application Ser. No. PCT/EP2008/004520, filed Jun. 6, 2008, which claims priority to German Patent Application Ser. No. 202007011911.9, filed Aug. 24, 2007, the entire specifications of all of which are expressly incorporated herein by reference.

FIELD OF THE INVENTION

The present invention relates to an edge trim for pieces of furniture, including a meltable film or melt layer.

BACKGROUND OF THE INVENTION

From EP 1163864, a furniture panel and a method for manufacturing the same are known. There, a generic edge trim is described for which the meltable film or layer can be welded to wood materials by means of laser technology. When fixing the edge trim on the piece of furniture, it is difficult for some materials to achieve a secure grip on the piece of furniture.

What is needed, therefore, is a solution that provides an edge trim for a piece of furniture, wherein an edge trim is fixable without a visible joint and adhesive-free on at least one edge of the piece of furniture, independent of the material that the piece of furniture is made of.

SUMMARY OF THE INVENTION

To solve this object, the present invention provides an edge trim for pieces of furniture comprising a meltable layer, wherein the molecular structure of the meltable layer contains both polar and non-polar parts so that the edge trim can be connected to pieces of furniture made of different materials by a supply of energy, for example, by light and/or radiation. In this way, the meltable layer can be connected directly by fusion in a material bonding manner to polar and non-polar materials.

A mechanical adhesion is achieved, for example, in that the meltable layer penetrates into a piece of furniture's cell structure, embraces the same and cures. A specific adhesion is achieved by different effects: the meltable layer containing polar as well as non-polar parts in the molecular structure shows a good affinity to materials such as wood to facilitate diffusion therein. For example, cellulose, which is contained in wood materials, and which contains OH-groups, show a strong dipolar character and hence adhesion to polar substances.

In accordance with one embodiment of the present invention, an edge trim for pieces of furniture having an exposed edge of wooden or wood substitute material is provided, comprising:

a molten layer and a structural layer;

wherein the structural layer and the molten layer are connected in an adhesive bond;

wherein the molten layer is made of a material that is chemically modified such that polar and non-polar components are found in a single molecular structure;

wherein the molten layer contains energy absorbing additives;

wherein the energy absorbing additives of the molten layer are selected from the group consisting of metal oxides, metal phosphates, metal salts of organic anions and combinations thereof.

In accordance with one aspect of this embodiment, the energy absorbing additives for the molten layer are selected from the group consisting of copper phosphates, tin phosphates, iron phosphates, nickel phosphates, molybdenum phosphates, cobalt phosphates, manganese phosphates, antimony phosphates and combinations thereof.

In accordance with one aspect of this embodiment, the energy absorbing additives for the molten layer is copper hydroxyphosphate in a weight fraction of 0.5-5%.

In accordance with one aspect of this embodiment, the structural layer is produced from a material selected from the group consisting of thermoplastic polymer, preferably polypropylene, acrylonitrile-butadiene-styrene copolymer, polyvinyl chloride, polymethyl methacrylate, polyethylene terephthalate and combinations thereof.

In accordance with one aspect of this embodiment, the molten layer is based on a thermoplastic polymer selected from the group consisting of polypropylene, acrylonitrile-butadiene-styrene copolymer, polyvinyl chloride, polymethyl methacrylate, polyethylene terephthalate and combinations thereof.

In accordance with one aspect of this embodiment, the molten layer is based on the material from which the structural layer is made.

In accordance with one aspect of this embodiment, the structural layer and the molten layer are coextruded.

In accordance with one aspect of this embodiment, the material of the molten layer has a lower melting point than the material of the structural layer.

In accordance with one aspect of this embodiment, the material of the molten layer is a copolymer, a grafted copolymer or a maleic anhydride grafted polypropylene.

In accordance with one aspect of this embodiment, the molten layer of the edge trim defines an underside or abutting side thereof.

In accordance with one aspect of this embodiment, the structural layer forms a top layer of the edge trim, which defines a top side or visible side thereof.

In accordance with one aspect of this embodiment, the top side comprises a décor.

In accordance with one aspect of this embodiment, the molten layer forms a bottom layer of the edge trim, which defines a bottom side or installation side thereof.

In accordance with one aspect of this embodiment, the structural layer comprises a thickness of 0.8 to 5.0 mm.

In accordance with one aspect of this embodiment, the molten layer comprises a thickness of 0.1 to 1.5 mm.

In accordance with an alternative embodiment of the present invention, a piece of furniture having an exposed edge with an edge trim, as described above and herein, is provided, wherein a bottom side of the edge trim is connected with a full surface with an edge of the piece of furniture in a material bonding manner.

In accordance with one aspect of this embodiment, a material comprising the piece of furniture is selected from the group consisting of wood materials, wood substitutes and combinations thereof.

In accordance with one aspect of this alternative embodiment, the material of the structural layer is selected from the group consisting of wood materials, wood substitutes, metals, glasses, plastics, stones, ceramics and combinations thereof.

In accordance with one aspect of this alternative embodiment, a bottom side of the piece of furniture has an average roughness $R_a$ greater than 10 μm.

Further areas of applicability of the present invention will become apparent from the detailed description provided hereinafter. It should be understood that the detailed description and specific examples, while indicating the preferred embodiment of the present invention, are intended for purposes of illustration only and are not intended to limit the scope of the present invention.

BRIEF DESCRIPTION OF THE FIGURES

Other advantages of the present invention will be readily appreciated as the same becomes better understood by reference to the following detailed description when considered in connection with the accompanying drawings wherein.

The same reference numerals refer to the same parts throughout the various Figures.

DETAILED DESCRIPTION OF THE INVENTION

The following description of the preferred embodiment(s) is merely exemplary in nature and is in no way intended to limit the present invention, or uses.

The edge trim 1 according to the present invention is described below with reference to the attached Figures.

The edge trim 1 according to the present invention for pieces of furniture 4 comprises a meltable layer 3 that contains polar as well as non-polar portions within the molecular structure. For this, the meltable layer 3 is made from a material that is chemically modified so that it contains polar as well as non-polar portions in the molecular structure. Thereby, the meltable layer 3 can be bonded directly by fusion in a material bonding manner to polar or non-polar materials. In the simplest variant, the edge trim 1 comprises exclusively the meltable layer 3, i.e., the edge trim 1 is made from the chemically modified material that contains polar as well as non-polar portions within the molecular structure.

The preferred edge trim 1 for pieces of furniture 4 comprises a structural layer 2 made from the chemically modified material that contains polar as well as non-polar portions in the molecular structure. Between the structural layer 2 and the meltable layer 3, none, one, or more intermediate layers can be provided so that the structural layer 2 and the meltable layer 3 are connected at least indirectly, preferably connected directly. The structural layer 2 can be omitted when the meltable layer 3 has a sufficient thickness to add the necessary rigidity to the edge trim 1. Because the chemically modified material of the meltable layer 3 is generally more expensive than the material of the structural layer 2, the variant with the structural layer 2 is preferred.

Figure 1:
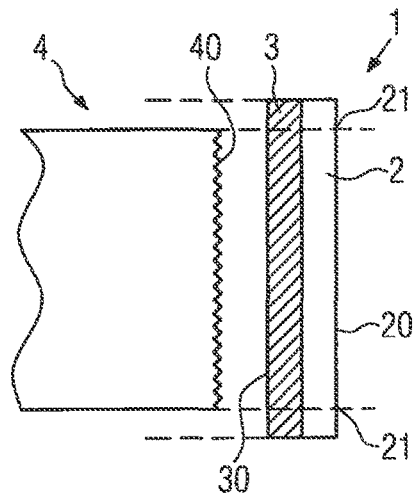
FIG. 1 shows a schematic sectional view of an edge of a piece of furniture and an edge trim, according to the present invention, to be bonded thereon.

FIG. 1 shows a schematic sectional view of an edge of a piece of furniture 4 and an edge trim 1, according to the present invention, to be bonded thereon.

As a structural layer 2 within the meaning of the present invention, a layer is designated that substantially gives the edge trim 1 its structure. A material of the structural layer 2 can be selected from any materials, e.g., the group of wood materials, wood substitutes, metals, glasses, plastics, stones, ceramics, and/or combinations thereof.

A preferred embodiment of the present invention relates to an edge trim according to the preceding embodiment, wherein the edge trim comprises a structural layer that is connected to the meltable layer. This measure has the advantage that the structural layer gives the edge trim the real structure, regardless of the function of the meltable layer, wherein each of the meltable layer and the structural layer can be configured functionally.

It can be advantageous when the meltable layer comprises polar and/or non-polar reactive molecule groups so that adhesive, and/or covalent, and/or ionic bonds can be achieved. The best results during bonding of the edge trims according to the present invention can be obtained when the polymer of the meltable layer has a very good flowability.

Such polar and/or reactive groups can be incorporated in the molecular structure of the meltable layer in a simple manner by, e.g., appropriate copolymerization and/or grafting, and or subsequent surface treatment (flame treatment, corona or plasma method). In addition, the reactive groups can form chemical bonds in the piece of furniture between the meltable layer and the respective bonding partner, thereby providing a particularly high bonding strength.

It can prove to be helpful when the meltable layer comprises molecular groups based on carboxylic acids, or their esters or salts, respectively, in particular acrylic acid, acryl ester, metharcrylic acid, methacrylic ester, methyl methacrylic ester; epoxides, isocyanates, phenol formaldehyde resin, silanes, titanates, alcohols, amides, imides, ammonium compounds or sulfonic acids or their esters, respectively, or salts, or the like.

Preferably, the meltable meltable layer comprises one or more of the molecular groups selected from these groups or mixtures thereof.

However, it is also within the scope of the present invention to use so-called blocked isocyanates and the like that reach their reactivity only at defined activation temperatures.

A further preferred embodiment of the present invention relates to an edge trim according to any of the preceding embodiments, wherein the structural layer is made from a thermoplastic polymer, preferably polypropylene, acrylonitrile-butadiene-styrene copolymer, polyvinyl chloride, polymethyl methacrylate, polyethylene terephthalate, polyethylene, styrene-ethylene-butadiene-styrene block copolymer, and polyamide, and the like. This measure has the advantage that the material is inexpensively available and easy to process.

A further preferred embodiment of the present invention relates to an edge trim according to any one of the preceding embodiments, wherein the meltable meltable layer is based on a thermoplastic polymer, preferably polypropylene, acrylonitrile-butadiene-styrene copolymer, polyvinyl chloride, polymethyl methacrylate, polyethylene terephthalate, polyethylene, styrene-ethylene-butadiene-styrene block copolymer, and polyamide, and the like. This measure has the advantage that this material is inexpensively available and good to process, and, in addition, it can be chemically modified in a simple manner.

In a further preferred embodiment, the meltable meltable layer is formed as a thermoplastic functional layer that allows it for the first time to fix, adhesive-free and without a visible joint, an edge trim according to the above described embodiments on a narrow side of a piece of furniture.

A further preferred embodiment of the present invention relates to an edge trim according to any one of the preceding embodiments, wherein the meltable meltable layer is based on the material from which the structural layer is made. This measure has the advantage that a particularly strong bond between the layers of the edge trim is generated.

A further preferred embodiment of the present invention relates to a profiled trim according to any one of the preceding embodiments, wherein the meltable meltable layer consists of a blend that consists of at least one of the above-mentioned thermoplastic polymers, at least a further polymer that comprises the above-mentioned polar and/or reactive molecule groups, and additives.

A further preferred embodiment of the present invention relates to an edge trim according to any one of the preceding embodiments, wherein the structural layer and the meltable layer are connected an adhesive bond. This measure has the advantage that the layers of the edge trim are bonded in a particularly firm manner.

A further preferred embodiment of the present invention relates to an edge trim according to any one of the preceding embodiments, wherein the structural layer and the meltable layer are coextruded. This measure has the advantage that the shaping of the edge trim proves to be particularly simple.

A further preferred embodiment of the present invention relates to an edge trim according to one of the preceding embodiments, wherein the material of the meltable layer has a lower melting point than the material of the structural layer. This measure has the advantage that during heating the edge trim up to a temperature above the melting point of the meltable layer, but below the melting point of the structural layer, only the meltable layer starts to melt and reaches a viscous and ductile state while the structural layer maintains its solid unchanged state.

A further preferred embodiment of the present invention relates to an edge trim according to any one of the preceding embodiments, wherein the material of the meltable layer is a copolymer, preferably a graft polymer, preferred maleic anhydride grafted polypropylene. This measure has the advantage that the material composition, in particular the portion of polar groups in the molecular structure, and hence the material properties can be adjusted selectively.

A further preferred embodiment of the present invention relates to an edge trim according to any one of the preceding embodiments, wherein the meltable layer contains energy-absorbing additives, preferably light- and/or radiation-absorbing additives, for example, laser pigments. This measure has the advantage that the meltable layer can be selectively energized and can be heated above the melting point. Preferably, the energy-absorbing additives are contained in certain melting sections in the meltable layer which are fused selectively, wherein the melting sections can be arranged in any pattern, e.g., as parallel lines along the longitudinal edge side of the edge trim.

Here, the energy absorbing additives of the melting layer are selected from the group of metal oxides, metal phosphates and metal salts of organic anions. Also advantageous as the energy absorbing additives for the melt layer are additives selected from copper phosphates, tin phosphates, iron phosphates, nickel phosphates, molybdenum phosphates, cobalt phosphates, manganese phosphates and antimony phosphates. Particularly advantageous are the energy-absorbing additives in the melt layer copper hydroxyphosphate or iron hydroxyphosphate.

Examples of suitable laser pigments for the meltable layer are as follows:

Copper hydroxide phosphate;

Quaterrylenes; and/or

Lanthanides, in particular lanthanum hexaboride.

The weight fraction of the pigments in the laser melt layer 3 is preferably as follows:

at copper hydroxide phosphate: 0.5-5%, for example 1-3%; and/or at Quaterrylenes and lanthanides: 10 ppm-10000 ppm, eg 20-1000 ppm.

Note that in a dark colored polymer, less of such pigments are required. In a light colored polymer, especially white, a much higher percentage of such pigments is required.

A further preferred embodiment of the present invention relates to an edge trim according to any one of the preceding embodiment, wherein the structural layer forms the top layer of the edge trim that defines a top side or visible side, respectively, of the edge trim. This measure has the advantage that the appearance of the edge trim is unchanged on the visible side after fusing and welding the meltable layer on a piece of furniture, e.g., a wooden panel (e.g., particle board, MDF board and/or the like).

A further preferred embodiment of the present invention relates to an edge trim according to any one of the preceding embodiments, wherein the top side of the edge trim comprises a decor. This measure has the advantage that the edge trim, despite a substantially identical structural configuration, can comprise different decorations, e.g., a decoration matching the placement area of a piece of furniture.

A further preferred embodiment of the present invention relates to an edge trim according to any one of the preceding embodiments, wherein the meltable layer forms the bottom layer of the edge trim that defines a bottom side or installation side, respectively, of the edge face. This measure has the advantage that the meltable layer can be welded directly to a front, to be the covered side of a piece of furniture, e.g. a wooden panel (e.g., article board, MDF board and/or the like).

In a further advantageous embodiment of the present invention, the meltable layer comprises additives, such as, e.g., dyestuffs, pigments, and/or the like, that result in an advantageous color match between the meltable layer and the cover layer, and also to the top side of the piece of furniture. The visible joint known from the prior art between the edge of the piece of furniture and the cover layer is thus avoided.

A further preferred embodiment of the present invention relates to an edge trim according to any one of the preceding embodiments, wherein the structural layer comprises a thickness of 0.8 to 1.6 mm, and more preferably 1.0 to 5.0 mm. This measure has the advantage that the structural layer adds a sufficiently rigid structure to the edge trim.

A further preferred embodiment of the present invention relates to an edge trim according to any one of the preceding embodiments, wherein the meltable layer comprises a thickness of 0.1 to 0.5 mm, and more preferably 0.2 to 0.5 mm.

This measure has the advantage that the meltable layer is carried out only in a required thickness to complete the bonding to the piece of furniture. Thereby, material of the meltable layer, which is more expensive compared to the material of the structural layer, can be saved.

A further preferred embodiment of the present invention relates to a piece of furniture with an edge trim according to any one of the preceding embodiments, wherein at least sections of the meltable layer are connected to an edge of the piece of furniture in a material bonding and/or chemical manner. This measure has the advantage that the meltable layer is connected in a material bonding and/or chemical bonding manner, and, if necessary, is also connected in a positively locking manner with the piece of furniture. By the partial welding, after which the meltable layer is welded to the edge of the piece of furniture only in sections, but with the edge completely covered by the edge trim, the meltable layer is to be energized only on selected positions so that time and energy are saved. The expression "chemically connected" designates a chemical bonding based on a chemical reaction between a reactive molecule group contained in the meltable layer and an appropriate bonding partner, respectively the edge of the piece of furniture. For this, the reactive molecule group contained in the meltable layer and the bonding partner are not limited as long as they are able to form a chemical bond with each other. The chemical bond between the molecule group in the meltable layer and the respective bonding partner in the piece of furniture provides for a particularly high bonding strength.

A further preferred embodiment of the present invention relates to a piece of furniture according to the preceding embodiment, wherein the bottom side of the edge trim is connected with the full surface with the edge of the piece of furniture in a material bonding and/or chemically bonding manner. This measure has the advantage that the meltable layer is securely and durably connected with the piece of furniture.

A further preferred embodiment of the present invention relates to a piece of furniture according to any one of the preceding embodiments, wherein the material of the piece of furniture is selected from a group of wood materials, wood substitutes, metals, glasses, plastics, stones, ceramics, and/or combinations thereof. This measure has the advantage that with respect to the material selection of the piece of furniture, the greatest possible freedom exists. Wood contains, for example, approx. 40% cellulose, approx. 25% holocellulose, and approx. 30% lignin. Cellulose is a linear chain molecule (up to 8 μm long) and is, in particular, responsible for the tensile strength of the wood. The holocelluloses are composed of different sugars, the chains are substantially shorter and comprise side groups and arborizations. The holocelluloses are connected with the lignin in the cell wall by covalent bonds. In particular, the celluloses comprise a variety of OH-groups that are necessary for the inner cohesion of the wood, but can also be used for the outer bonding of the meltable layer. These OH-groups are particularly suitable to form a chemical bond with the reactive molecule groups contained in the meltable layer.

Principally, all materials that have appropriate reactive groups on the surface, that come into contact with the edges of, for example, pieces of furniture, are suitable for chemical bonds. If necessary, the materials can be surface-modified first if a chemical bond between edge trim and furniture material is desired and the materials per se do not comprise any or not enough chemically reactive bonding partners.

A further preferred embodiment of the present invention relates to a piece of furniture according to any one of the preceding embodiments, wherein the material of the structural layer is selected from a group of wood materials, wood substitutes, metals, glasses, plastics, stones, ceramics, and/or combinations thereof. This measure has the advantage that with respect to the material selection, the greatest possible freedom exists.

In a preferred exemplary embodiment, the structural layer 2 is made from a thermoplastic polymer, preferably polypropylene, acrylonitrile-butadiene-styrene copolymer, polyvinyl chloride, polymethyl methacrylate, polyethylene terephthalate, and/or the like.

In the shown exemplary embodiments, the structural layer 2 forms at the same time the top layer 2 of the edge trim 1, which defines a top side or visible side 20, respectively, of the edge trim 1. Alternatively, above the structural layer 2, one or more layers are arranged, for example a decor film or decor layer, respectively, with a decorated surface. The structural layer 2 comprises a thickness of 0.8 mm to 5.0 mm, and more preferably 1.0 to 3.0 mm.

Within the scope of this description, as meltable layer 3, a layer is designated that consists of a meltable material and that preferably softens upon temperature increase above the melting point, and takes a viscous or ductile state, respectively, and solidifies again during cooling.

The material of the meltable layer 3 is chemically modified in such a manner, that it contains polar, and/or non-polar, and/or reactive molecule groups. Thus, the material of the meltable layer 3 is also designated as compatibly facilitator. The material of the meltable layer 3 can be bonded by fusion directly to polar and non-polar materials. The meltable layer 3 is preferably based on the same material as the structural layer 2, i.e., on a non-polar material, preferably plastic, and more preferably polypropylene, acrylonitrile-butadiene-styrene copolymer, polyvinyl chloride, polymethyl methacrylate, polyethylene terephthalate, and/or the like, but is chemically modified. In particular, the material of the meltable layer 3 is a copolymer, more preferably a grafted copolymer, and more preferably a maleic anhydride grafted polypropylene. The material of the meltable layer 3 contains a proportion of up to four percent polar and/or reactive groups in the molecular structure, preferably between 0.5 and 2%, preferably 1%. The meltable layer 3 has a thickness of 0.1 mm to 1.5 mm, and more preferably 0.2 mm to 0.5 mm. Preferably, the meltable layer contains one or more of the molecular groups based on carboxylic acid or their ester or salts, in particular acrylic acid, acrylic ester, metharcrylic acid, methacrylic ester, methyl methacrylic ester; epoxides, isocyanates, phenol formaldehyde resin, silanes, titanates, alcohols, amides, imides, ammonium compounds or sulfonic acids or their esters, respectively, or salts, and/or the like.

The structural layer 2 and the meltable layer 3 are preferably connected in a material bonding manner, preferred coextruded. The material of the meltable layer 3 has preferably a lower melting point than the material of the structural layer 2. If the edge trim 1 is heated up to a specified temperature that is above the melting point of the material of the meltable layer 3, but below the melting point of the structural layer 2, only the material of the meltable layer 3 is softened or melted, respectively, whichever is desired.

Figure 3:
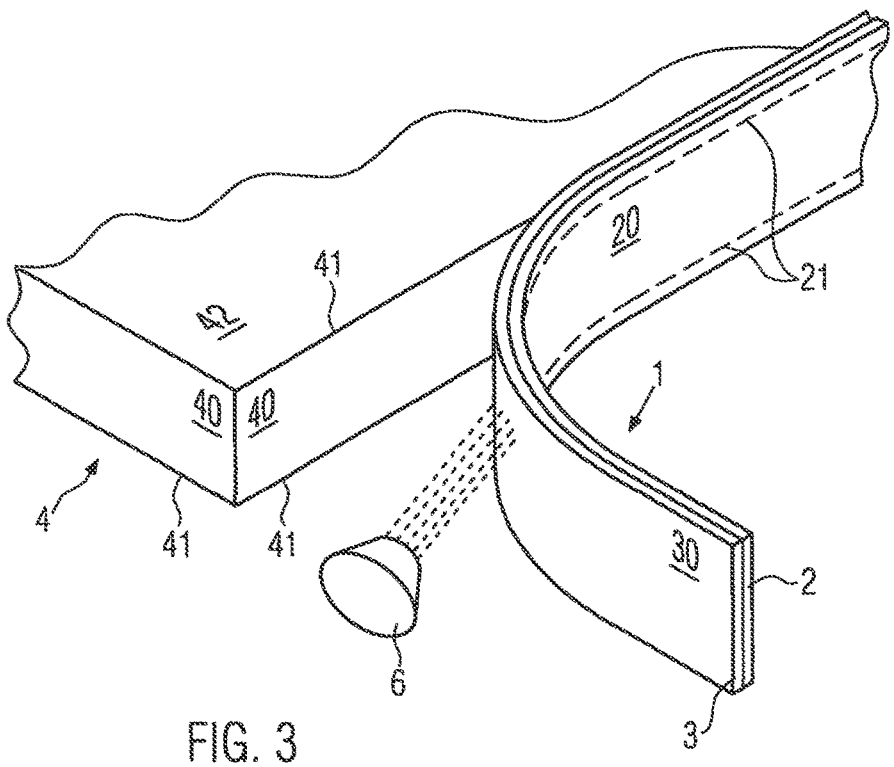
FIG. 3 shows a schematic and perspective view of an edge of a piece of furniture with a partially bonded edge trim, according to the present invention, for illustration of a method for attaching the edge trim on the edge of the piece of furniture.

FIG. 3 shows a schematic and perspective view of a piece of furniture 4 with the edge trim 1 according to the present invention, wherein the meltable layer 3 of the edge trim 1 is directly connected in a material bonding manner with an edge 40 of the piece of furniture 4, or is in process to be connected, respectively.

The piece of furniture 4 comprises a board (e.g., table board, kitchen counter top, etc.) made from a material that is selected from any materials, e.g., the group of wood materials, wood substitutes, metals, glasses, plastics, stones, ceramics, and/or combinations thereof.

In the present example, the piece of furniture 4 is a board made from a wood material, in particular a particleboard or a MDF board. The piece of furniture 4 comprises edges 40 that are defined and bordered by edge sides 41, a top side or placement side 42, and a bottom side (not shown).

In the exemplary embodiment according to FIG. 3, the edge trim 1 comprises the preferred configuration with a structural layer 2 defining the visible side 20, and a meltable layer 3 defining the installation side 30, and comprises a flexible structure.

The material of the structural layer 2 is polypropylene. The material of the meltable layer 3 is a maleic anhydride grafted polypropylene. The edge trim 1 is moved towards the edge 40 of the piece of furniture to be covered by means of a substantially conventional method, wherein directly before the move of the edge trim 1 towards the edge 40, energy is applied onto the installation side 30 of the meltable layer 3 by means of an energy supply means 6. By applying energy, the meltable layer 3 is heated.

The energy is supplied in any form, preferably in the form of laser light, hot air, microwaves, ultra sound, etc., wherein an energy absorption means (e.g., laser pigments), that is preferably contained in the meltable layer 3, absorbs the energy supplied by the energy supply means 6 and heats the meltable layer 3 above the melting point. For this, it is not required that the meltable layer 3 is completely fused, but that the meltable layer 3 is softened only on the installation side 30 so that at least in sections, the meltable layer 3 takes a viscous or ductile state, respectively, and by pushing the edge trim 1 onto the edge 40 of the piece of furniture 4, engages mechanically with the preferably rough surface structure of the edge 40 of the piece of furniture 4. By means of the determined chemical properties of the edge trim 1, in addition, the meltable layer 3 is connected with the edge 40 of the piece of furniture 4 in a material bonding manner.

By the energy supply means 6, preferably enough energy is supplied to a meltable layer 3 comprising reactive molecular groups that an activation energy is exceeded to initiate a chemical reaction and to achieve a chemical bond between the meltable layer 3 and the respective bonding partner, here, the piece of furniture 4. Applying energy to the meltable layer 3 to cause a chemical reaction and a chemical bond between the meltable layer 3 and the edge 40 of the piece of furniture 4 to connect the meltable layer 3 and the edge 40 of the piece of furniture 4 in a chemically manner, is carried out selectively at the same time of or independent from the energy supply to the meltable layer 3 for melting the meltable layer 3.

The activation energy to achieve a chemical bond between the meltable layer 3 and the respective bonding partner, here, the piece of furniture 4, is influenced, among other things, by the following parameters:
 Temperature;
 Radiation (laser, UV-light);
 Contact force;
 Joint gap;
 Layer thickness;
 Curing time;
 Ambient air (humidity, oxygen content);
 Substrate surface; and/or
 Pretreatment.

For a meltable layer 3 of maleic anhydride grafted polypropylene (PP-MAH), the meltable layer 3 is heated, for example, to a temperature of higher than +135° C. Normally, this temperature is high enough so that the maleic anhydride (MAH) reacts with the OH— groups of the wood to achieve a chemical bond.

Normally, the edge trim 1 is fabricated oversized and is moved towards the edge 40 of the piece of furniture 4 in such a manner that on both sides of the edge trim 1 an overhang area between the dashed lines 21 and the edges of the edge trim 1 is generated in the bonded state. This material overhang is removed by means of a machining operation so that the edges on the longitudinal side of the edge trim 1 and the placement face 42 as well as the bottom side (not shown) of the piece of furniture 4 are flush.

It is sufficient when the installation side 30 of the edge trim 1 is connected at least in sections with the edge 40 of the piece of furniture 4 in a material bonding and/or chemical bonding manner, or is welded, respectively. For this, point-shaped, line-shaped or checkered welding patterns are possible, that are achieved, for example, by selectively applying energy-absorbing additives onto the meltable layer 3. However, it is preferred that the meltable layer 3 is connected or welded, respectively, with the full surface to the edge 40 of the piece of furniture 4. This applies in particular to the corner areas of the piece of furniture 4, where the edge trims 1, for example, are arranged adjacently at the corner, to avoid the edge trims 1 peeling off starting at the corner areas of the piece of furniture 4.

Figure 2:
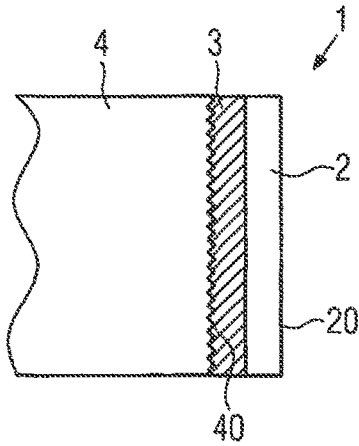
FIG. 2 shows a schematic sectional view of an edge of a piece of furniture and the edge trim, according to the present invention, bonded thereon.

FIG. 2 shows the connected condition of the edge trim 1 according to the present invention and the piece of furniture 4. Here is illustrated how the material of the meltable layer 3, that is first meltable and subsequently solidified, engages with the rough or porous or micro-porous surface structure at the edge 40 of the piece of furniture 4 so that the meltable layer 3 is connected in an adhesive bond, and, if the surface structure of the piece of furniture 4 allows it, also in a positively locking manner with the piece of furniture 4.

Roughness is evident on the end face 40 of the piece of furniture 4, which shows irregularities on its surface in the form of microscopic pits, pores, undercuts or the like. The irregularities occur when the furniture item 4 is constructed as chipboard or MDF board and therefore is made up of a multitude of small wood particles firmly pressed together. Thus, a primary advantage of the present invention is the strong bond and mechanical interlock that occurs after pressing the edge strip 1 to the end face 40 of the piece of furniture 4. On pressing, the material of the melt layer 3 in the molten state flows or extrudes into the irregularities, and thus results in a very intimate/form-locking connection between the edge strip 1 and the piece of furniture 4.

The roughness Ra of the front side 40 of the piece of furniture 4 is measured over the entire width B of the front end 40, wherein Ra is usually more than 10 microns, for example, more than 20 microns, more preferably greater than 30 microns, for example, and still more preferably greater than 50 microns.

To determine the median roughness Ra, the surface of the front side 40 of the furniture 4 is scanned across the width B (through the parameter x) and all the height and depth differences of this rough surface are recorded.

After calculating the definite integral of this roughness gradient over the entire test section, this final result is divided by the length of the test section B (width of the front page 40). In terms of formulas, this means that first the height average M is calculated as follows:

$$M = \frac{A}{B}\int_O^B z(x)dx$$

When determining the median roughness Ra the amount between the local height value z (x) and the calculated height average M is formed and integrated up along the paths parameter x over the entire width B of the end face 40:

$$R_a = \frac{A}{B}\int_O^B |z(x) - M|dx$$

Due to the denser, stronger compression of the wood particles nearer to the surfaces of the piece of furniture 4 as viewed in cross section in the middle region of the end face 40, the $B_M$ roughness is usually larger than in the two outlying (denser) edge regions.

For example, for the middle third $B_M=\frac{1}{3}$ of the front face 40 B viewed only in cross section, the average roughness Ra for MDF board measures more than 50 microns, more preferably greater than 100 microns, and still more preferably greater than 200 microns.

Thus, it has been shown to chip boards that in the central region of the end face, the roughness is typically greater, because larger, not fully pressed wood particles or chips are arranged so that the average roughness Ra of the front end of a chip board in the central region $B_M$ as may be more than 200 microns, and more preferably greater than 500 microns.

Figure 4:
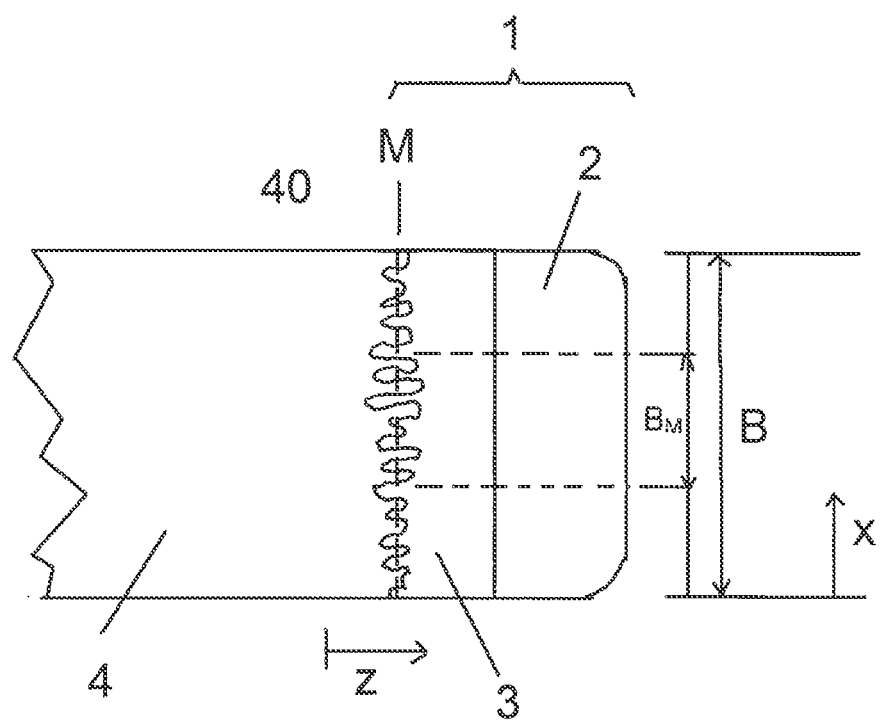
FIG. 4 shows a detailed schematic sectional view of an edge of a piece of furniture and the edge trim, according to the present invention, bonded thereon.

Referring now to FIG. 4, for clarity, both the thickness of the melt layer 3, as well as the rough surface of the end face 40, has greatly increased.

Particularly preferred variants of the edge trim 1 according to the present invention are mentioned below under specification of the respective materials:

Variant 1 (PP-edge):
Structural layer: Polyporopylene (PP); and
Meltable layer: PP-maleic anhydride.
Variant 2 (ABS-edge):
Structural layer: Acrylonitrile-butadiene-styrene copolymer (ABS); and
Meltable layer: Ethylene vinyl acetate, ethylene vinyl acetate-maleic anhydride, ethylene methacrylate, polyurethane (thermoplastic), ABS-maleic anhydride or styrene-ethylene-butadiene-styrene-block polymer-maleic anhydride, adhesion-modified copolyamide.
Variant 3 (PVC-edge):
Structural layer: Polyvinyl chloride (PVC); and
Meltable layer: PVC-ethylene vinyl acetate-copolymer or PVC-polyacrylic ester, adhesion-modified copolyamid; ABS-maleic anhydride.
Variant 4 (PMMA/PET-edge):
Structural layer: Polymethyl methacrylate (PMMA) or polyethylene terephthalate PET); and
Meltable layer: Ethylene butylene acrylate, ethylene methacrylate, ethylene vinyl acetate, epoxidized acrylate, polyester (maleic anhydride grafted).
Variant 5 (PP-edge):
Structural and meltable layer: PP-maleic anhydride grafted.

While the present invention has been described with reference to an exemplary embodiment, it will be understood by those skilled in the art that various changes can be made and equivalents can be substituted for elements thereof without departing from the scope of the present invention. In addition, many modifications can be made to adapt a particular situation or material to the teachings of the present invention without departing from the essential scope thereof. Therefore, it is intended that the present invention not be limited to the particular embodiment disclosed as the best mode contemplated for carrying out this present invention, but that the present invention will include all embodiments falling within the scope of the appended claims.

What is claimed is:

1. An edge trim for pieces of furniture having an exposed edge of wooden or wood substitute material, comprising:
a meltable layer; and
a structural layer;
wherein the structural layer and the meltable layer are connected in an adhesive bond;
wherein the meltable layer is made of a material that is chemically modified such that polar and non-polar components are found in a single molecular structure;
wherein the meltable layer is based on a material from which the structural layer is produced;
wherein the structural layer is produced from polypropylene;
wherein the meltable layer is based on polypropylene;
wherein the meltable layer contains energy absorbing additives;
wherein the energy absorbing additives of the meltable layer are selected from the group consisting of copper phosphates, tin phosphates, iron phosphates, nickel phosphates, molybdenum phosphates, cobalt phosphates, manganese phosphates, antimony phosphates and combinations thereof.

2. The edge trim according to claim 1, wherein the copper phosphates include copper hydroxyphosphate in a weight fraction of 0.5-5%.

3. The edge trim according to claim 1, wherein the structural layer and the meltable layer are coextruded.

4. The edge trim according to claim 1, wherein the material of the meltable layer has a lower melting point than the material of the structural layer.

5. The edge trim according to claim 1, wherein the polypropylene is a copolymer, a grafted copolymer or a maleic anhydride grafted polypropylene.

6. The edge trim according to claim 1, wherein the meltable layer of the edge trim defines an underside or abutting side thereof.

7. The edge trim according to claim 1, wherein the structural layer forms a top layer of the edge trim, which defines a top side or visible side thereof.

8. The edge trim according to claim 7, wherein the top side comprises a décor.

9. The edge trim according to claim 1, wherein the meltable layer forms a bottom layer of the edge trim, which defines a bottom side or installation side thereof.

10. The edge trim according to claim 1, wherein the structural layer has a thickness of 0.8 to 5.0 mm.

11. The edge trim according to claim 1, wherein the meltable layer has a thickness of 0.1 to 1.5 mm.

12. A piece of furniture having an exposed edge with an edge trim according to claim 1, wherein a bottom side of the edge trim is connected with a full surface with an edge of the piece of furniture in a material bonding manner.

13. The piece of furniture according to claim 12, wherein a material comprising the piece of furniture is selected from the group consisting of wood materials, wood substitutes and combinations thereof.

14. The piece of furniture according to claim 13, wherein the material of the structural layer is selected from the group consisting of wood materials, wood substitutes, metals, glasses, plastics, stones, ceramics and combinations thereof.

15. The piece of furniture according to claim 13, wherein a bottom side of the piece of furniture has an average roughness $R_a$ greater than 10 μm.

16. A piece of furniture having the edge trim according to claim 1 attached to an exposed edge of wooden or wood substitute material of the piece of furniture, wherein the exposed edge is an end face of the piece of furniture, wherein due to a denser, stronger compression of wood particles or chips nearer to a surface of the piece of furniture as viewed in cross section in a middle region of the end face, a roughness of the middle region is larger than in at least one adjacent denser edge region, and wherein a bottom side of the edge trim is connected with a full surface with the exposed edge of the piece of furniture in a material bonding manner.

17. The piece of furniture according to claim 16, wherein the piece of furniture is a chipboard, wherein a width of the middle region is ⅓ of a width of the end face, and wherein an average roughness $R_a$ in the middle region is more than 200 microns.

18. The piece of furniture according to claim 16, wherein the piece of furniture is a chipboard, wherein a width of the middle region is ⅓ of a width of the end face, and wherein an average roughness $R_a$ in the middle region is more than 500 microns.

* * * * *